United States Patent
Tjahjadi

(10) Patent No.: US 7,474,713 B2
(45) Date of Patent: Jan. 6, 2009

(54) SYSTEM AND METHOD FOR DEMODULATING MULTIPLE QAM SIGNALS

(75) Inventor: Taruna Tjahjadi, Snellville, GA (US)

(73) Assignee: Broadcom Corporation, Irvine, CA (US)

( * ) Notice: Subject to any disclaimer, the term of this patent is extended or adjusted under 35 U.S.C. 154(b) by 601 days.

(21) Appl. No.: 11/197,262

(22) Filed: Aug. 5, 2005

(65) Prior Publication Data

US 2007/0030916 A1 Feb. 8, 2007

(51) Int. Cl.
- *H04L 27/22* (2006.01)
- *H03K 9/00* (2006.01)
- *H03D 1/00* (2006.01)
- *H03D 3/00* (2006.01)

(52) U.S. Cl. ........................ 375/324; 375/316; 375/320; 375/322

(58) Field of Classification Search ................ 375/324
See application file for complete search history.

(56) References Cited

U.S. PATENT DOCUMENTS 5,600,672 A * 2/1997 Oshima et al. .............. 375/219
5,729,173 A * 3/1998 Sato ........................... 329/308
6,373,316 B1 * 4/2002 Wu ............................. 327/356
2002/0159533 A1 * 10/2002 Crawford .................... 375/260
2003/0206052 A1 * 11/2003 Chiou ......................... 329/304
2006/0256910 A1 * 11/2006 Tal et al. ..................... 375/376

FOREIGN PATENT DOCUMENTS

WO WO0131800 * 5/2001
WO WO0191396 * 11/2001

OTHER PUBLICATIONS

"Demodulation of cochannel QAM signals" Gooch, R.P.; Sublett, B.J.; Acoustics, Speech, and Signal Processing, 1989. ICASSP-89., 1989 International Conference on, pp. 1392-1395 vol. 2., May 23-26, 1989.*

"A multilevel QAM demodulator VLSI with wideband carrier recovery and dual equalizing mode" Yamanaka, K.; Takeuchi, S.; Murakami, S.; Koyama, M.; Ido, J.; Fujiwara, T.; Hirano, S.; Okada, K.; Sumi T.; Solid-State Circuits, IEEE Journal of vol. 32, Issue 7, pp. 1101-1107. Jul. 1997.*

* cited by examiner

*Primary Examiner*—Mohammad H Ghayour
*Assistant Examiner*—Sarah Hassan
(74) *Attorney, Agent, or Firm*—Sterne, Kessler, Goldstein & Fox, P.L.L.C.

(57) ABSTRACT

A system and method demodulate N QAM signals (N being a positive integer equal to or greater than 1) substantially simultaneously using, for example, one or two oscillators, regardless of how many QAM signals need to be demodulated.

20 Claims, 8 Drawing Sheets

SYSTEM AND METHOD FOR DEMODULATING MULTIPLE QAM SIGNALS

BACKGROUND

1. Field of the Invention

Figure 1:
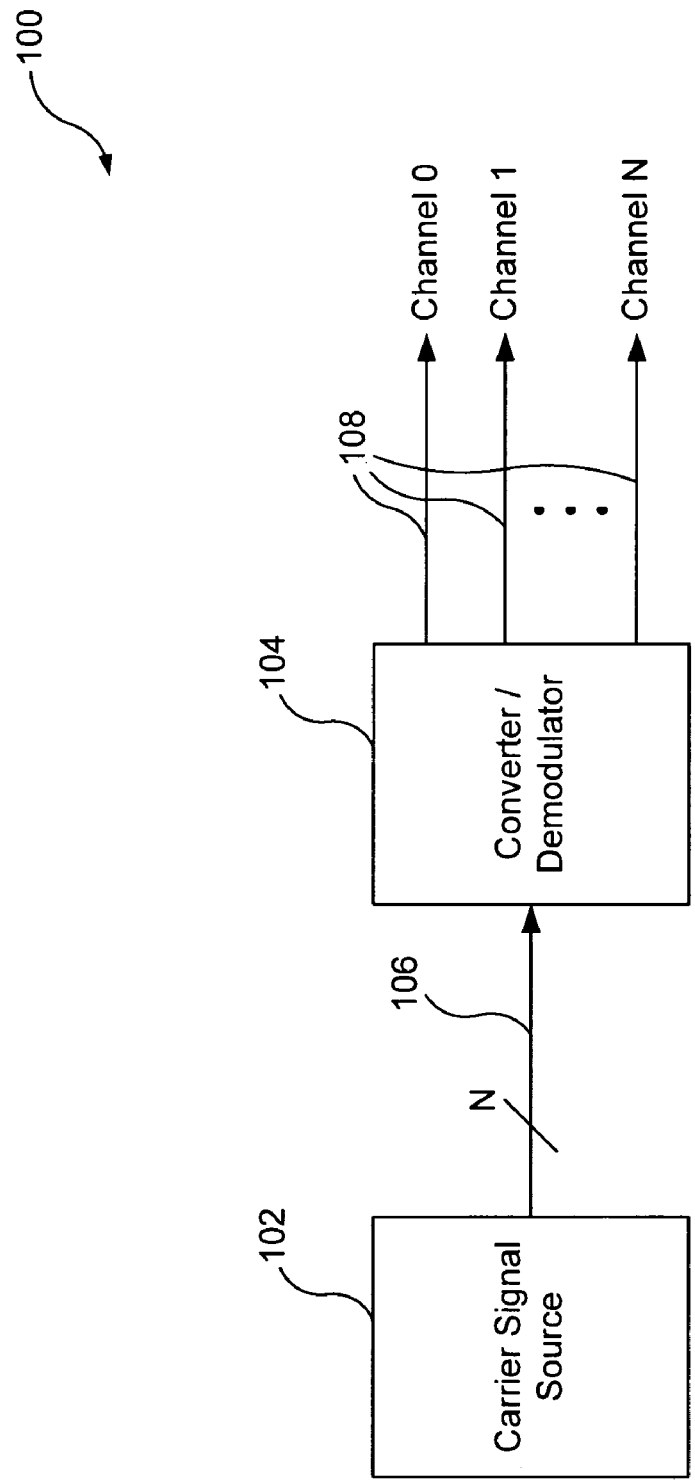

The present invention is related to a system and method for demodulating multiple Quadrature Amplitude Modulation (QAM) signals.

2. Background Art

In one example, the need to demodulate several QAM (Quadrature Amplitude Modulation) carriers or signals simultaneously arises when channel bonding is introduced in the future specifications of Docsis 3.0 (Data-Over-Cable Service Interface Specification 3.0). Channel bonding is a technology that combines two or more physical channels into a single virtual channel, effectively doubling or greater the data transfer speeds. When a receiver needs to demodulate several carrier signals (e.g., QAM signals), it needs to generate a local oscillator (sine and cosine) for each of the QAM signals. Conventionally, implementation of this requirement resulted in using an equal number of NCOs (Numerically Controlled Oscillators), or other forms of implementation for generating the local carriers, as there were QAM signals. An NCO can been seen as referring to a block or device that generates a local carrier consisting of cosine and sine. For example, typically N numbers of NCOs were required for N number of QAM signals to be demodulated. If N becomes too large the implementation will become very costly.

Therefore, what is needed is a system and method that reduces a number of oscillators needed to demodulate multiple carrier signals.

SUMMARY

An embodiment of the present invention provides a system that demodulates carrier signals comprising at least a first oscillator, and in one example a second oscillator, and at least first through third demodulators.

In the example using two oscillators, the first oscillator produces first and second signals, the first signal having a frequency that is phase separated 90 degrees from a frequency of the second signal. The second oscillator produces third and fourth signals, the third signal having a frequency that is phase separated 90 degrees from a frequency of the fourth signal. The first demodulator receives the first and second signals and first and second carrier signals, the first demodulator generating a first pair of demodulated signals therefrom. The second demodulator receives the third and fourth signals and the first pair of demodulated signals, the second demodulator generating a second pair of demodulated signals therefrom. The third demodulator receives the fourth signal and the first and second pair of demodulated signals, the third demodulator generating a third pair of demodulated signals therefrom. The first, second and third pair of demodulated signals are transmitted along first, second, and third channels, respectively.

In another example, when the frequency of the first carrier signal is equal to the distance between the first and second carrier signals, the second oscillator is eliminated from the system. When the second oscillator is eliminated from the system the second demodulator receives the first and second signals and the first pair of demodulated signals and the third demodulator receives the first and second signals and the first and second pair of demodulated signals.

In another embodiment, a method comprises: (a) determining a spacing between signals and a frequency of the signals in a received block of signals, (b) initiating one or both oscillation devices in a pair of oscillation devices based on the spacing and the frequency of the signals, (b) determining what demodulator in a set of demodulators begins demodulation of the signals based on which signal in the block of signals is first received by the set of demodulation devices, and (c) demodulating the block of signals.

In yet another embodiment of the present invention, there is provided a method of demodulating a plurality of input channels comprising: generating a first oscillating signal to demodulate a first channel of the plurality of input channels, generating a second oscillating signal to demodulate a second channel of the plurality of input channels, and demodulating a third channel of the plurality of input channels based on the first and second oscillating signals.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 1 shows a system, according to one embodiment of the present invention.

FIGS. 2, 3, 4, 5, and 6 shows various arrangements of a portion of the system shown in FIG. 1, according to various embodiments of the present invention.

Figure 7:
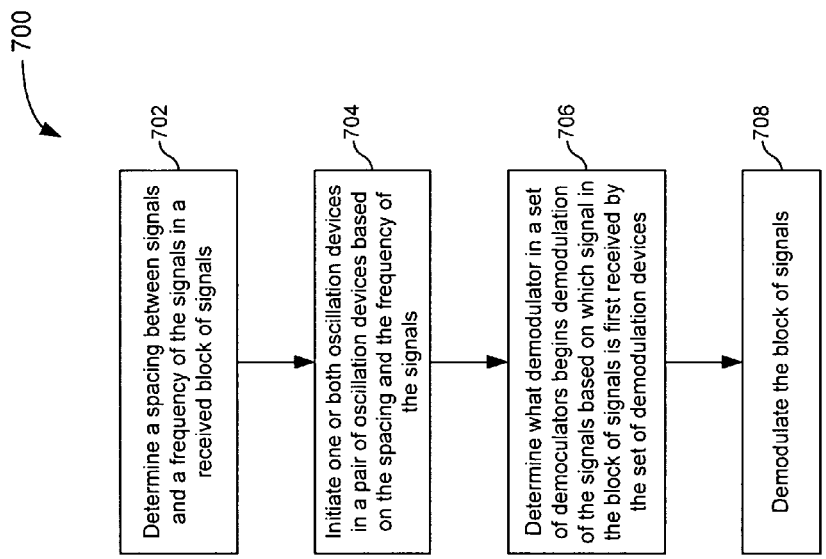
Figure 8:
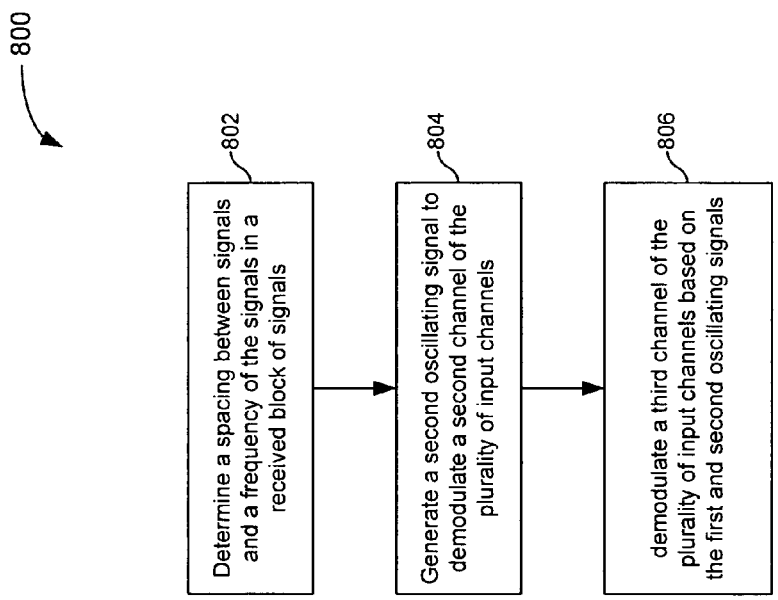

FIGS. 7 and 8 are flowcharts depicting methods, according to various embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

Overview

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Embodiments of the present invention provide a system and method for demodulating N QAM signals (N being a positive integer equal to or greater than 1) substantially simultaneously using, for example, one or two oscillators, regardless of how many QAM signals need to be demodulated.

This approach will be more cost efficient and save some silicon area, and hence power consumption, especially if N is large.

In one example, the system and method are not limited to digital implementation, and in another example the system and method can be applied to analog demodulation.

The digital example is based on the assumption that an RF signal of the multiple QAM carriers that are to be demodulated are already block converted and digitized through an analog to digital converter (A/D). It is also assumed that the frequency spacing between adjacent carriers for all carriers is the same.

Overall System

FIG. 1 shows a system 100, according to one embodiment of the present invention. System 100 includes a carrier signal source 102 coupled to a converter/demodulator 104 (e.g., a set top box, a modem, or the like). N signals 106 are transmitted between carrier signal source 102 and converter/demodulator 104, where N is an integer greater than or equal to 1. Converter/demodulator 104 then spreads the N signals onto N channels 108. For example, in a cable TV environment, N digital or analog cable carrier signals 106 (e.g., QAM carriers) are received at a converter/demodulator 104 (e.g., modem) and demodulated into N signals along channels 108 to be used by a display device (not shown). In one example, the N signals 106 are sampled at a first frequency ωA (e.g., a frequency demodulation will start at) and spaced a distance ωB apart. For example in the US ωB is 6 MHz and in Europe ωB is 8 MHz, while in other countries other spacings can be used.

Figure 2:
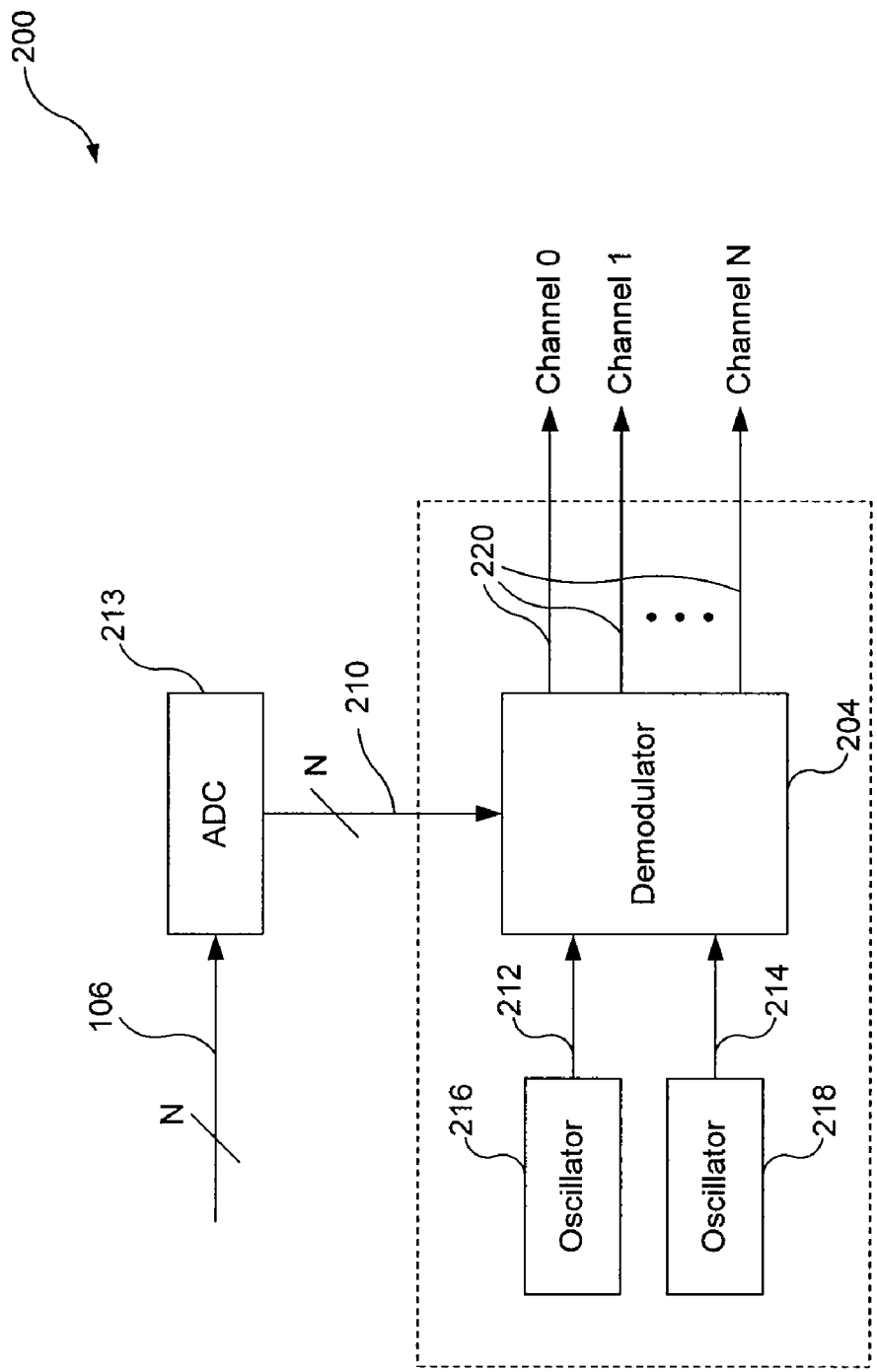

FIG. 2 shows a system 200, according to one embodiment of the present invention. In system 200, similar to system 100, N signals 106 are received, but in this embodiment signals 106 are analog signals that are converted to digital signals 210 through use of a converter 213, for example an analog-to-digital converter. In one example, digital signals 210 are referred to as RF or radio frequency signals. Digital signals 210 are received by a demodulator 204, which also receives first and second oscillator signals 212 and 214, respectively, from first and second oscillators 216 and 218. For example, these signals can be considered first and second clock signals that are 90 degrees apart. Demodulator 204 demodulates digital signals 210 using first and second oscillator signals 212 and 214, as is described in more detail below, to produce demodulated signals along channels 220.

In one example, oscillators 216 and/or 218 (and the other oscillators described below) are programmable oscillators, such as numerically controlled oscillators that are programmed by receiving a certain value corresponding to a desired frequency. In other examples, oscillators 216 and/or 218 can be dedicated to a single frequency.

In this embodiment, only two oscillators 216 and 218 are required for demodulator 204 to demodulate N number of digital signals 210, as is described in more detail below with respect to FIGS. 3 and 4. This is in contrast to conventional systems, as described above, in which N oscillators would have been required for N signals.

In one example, where ωA and ωB are the same, only one oscillator signal from one oscillator, for example oscillator 216, would be required to have demodulator 204 demodulate N number of digital signals 210, as is described in more detail below with respect to FIGS. 5 and 6.

It is to be appreciated the systems and methods described herein can be used to simultaneously demodulate a block of signals with constant spacing between the signals in any environment.

Exemplary Operation

Figure 3:
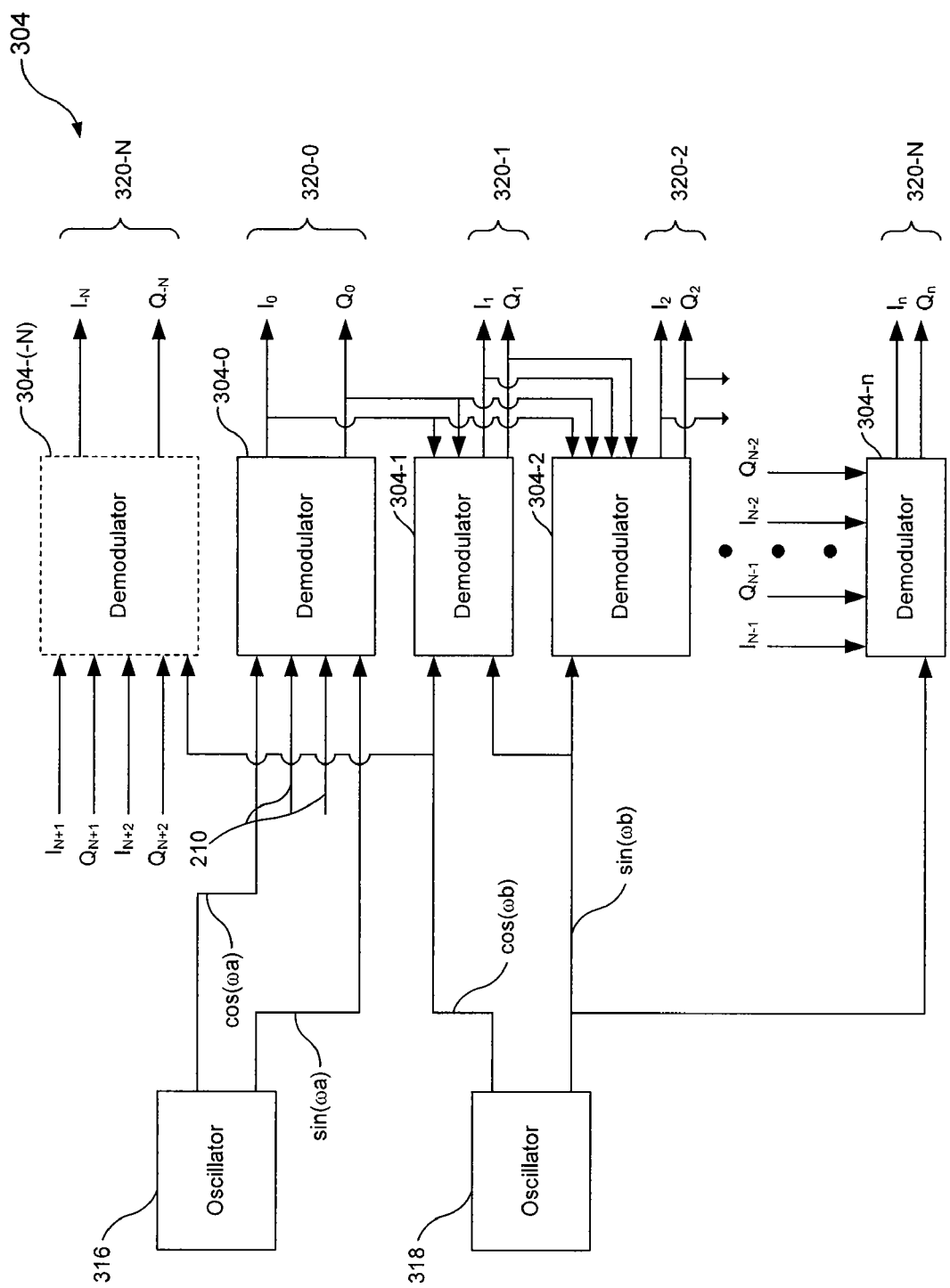
Figure 4:
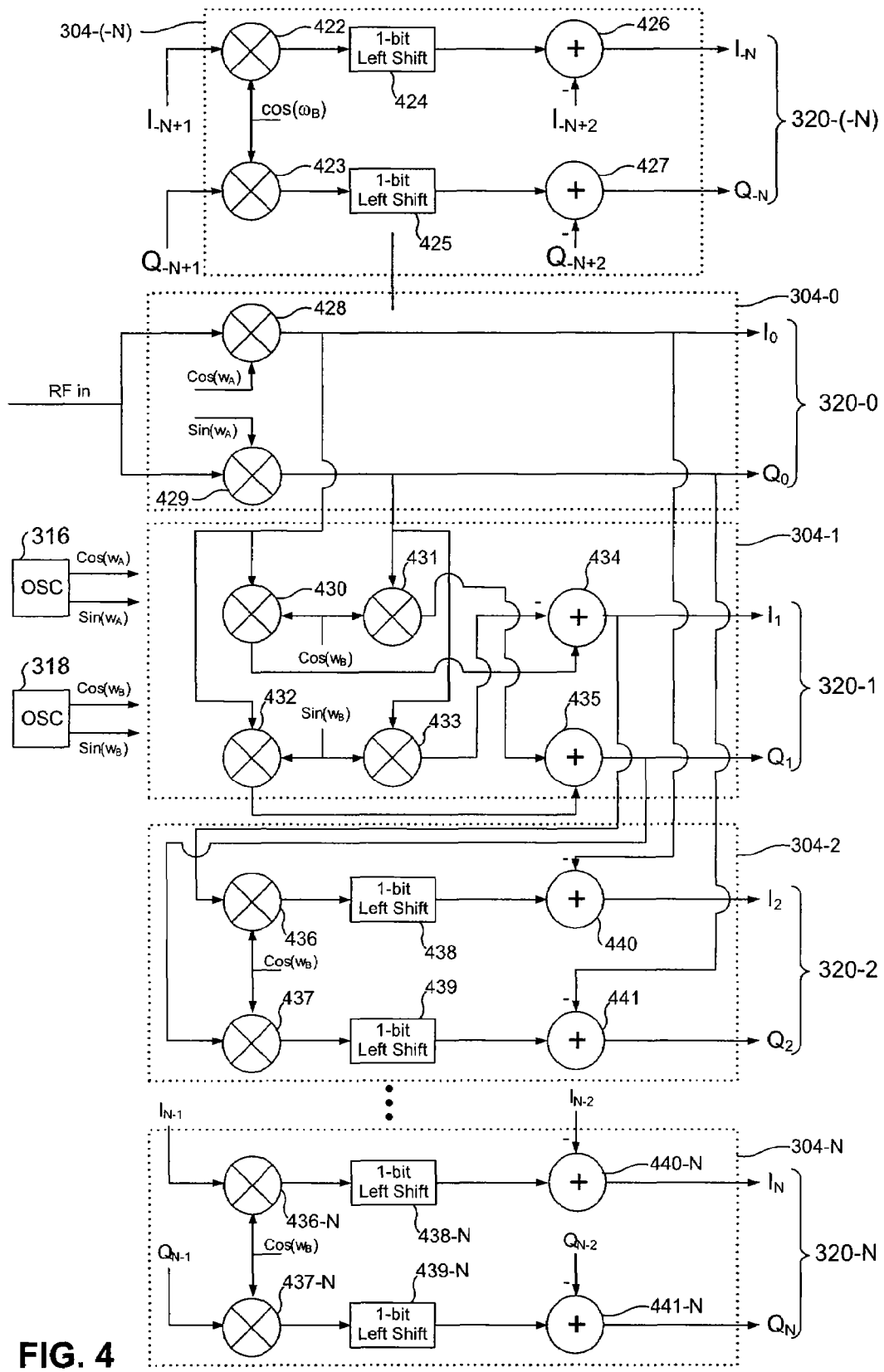

FIGS. 3 and 4 show a demodulator 304, according to one embodiment of the present invention. Demodulator 304 is one embodiment of demodulator 204. In this embodiment, a first oscillator 316 produces a first oscillator signal or first signal $\cos(\omega_A)$ and a second oscillator signal or second signal $\sin(\omega_A)$. A second oscillator 318 produces a first oscillator signal or first signal $\cos(\omega_B)$ and second oscillator signal or second signal $\sin(\omega_B)$. Both oscillators' signals are received by demodulator 304 that comprises N demodulators 304-0 to 304-N. In one example, an optional demodulator 304-(−N) is also within demodulator 304. Demodulator 304 also receives signal 106 or 210 as Io and Qo.

In one example, S(n) is defined as the digitized multiple QAM carrier RF signal (e.g., either 106 or 210) that is demodulated and we will define $\omega_A$ as the channel carrier frequency and use it as a starting point for demodulation. We will also define $\omega_B$ as the channel spacing frequency.

In this embodiment, for channel 320-0 when carrier frequency $\omega_A$ is used, the demodulation process in demodulator 304-0 produces:

$$S*\cos(\omega_A), \text{ for inphase.} \quad (1)$$

$$S*\sin(\omega_A), \text{ for quadrature.} \quad (2)$$

Where signals $\cos(\omega_A)$ and $\sin(\omega_A)$ are the Inphase and Quadrature local oscillators, respectively. Note that for simplicity the time index (n) notation has been dropped.

If we proceed to the next higher frequency channel 320-1, then for carrier frequency $\omega_A+\omega_B$, the required Inphase and Quadrature local oscillators output from demodulator 304-1 will be $$\cos(\omega_A+\omega_B), \text{ for inphase.} \quad (3)$$

$$\sin(\omega_A+\omega_B), \text{ for quadrature.} \quad (4)$$

Equation (3) and (4), respectively, can be expanded as $$\cos(\omega_A)*\cos(\omega_B)-\sin(\omega_A)*\sin(\omega_B)=2*\cos(\omega_A)*\cos(\omega_B)-\cos(\omega_A-\omega_B) \quad (5)$$

and $$\sin(\omega_A)*\cos(\omega_B)+\cos(\omega_A)*\sin(\omega_B)=2*\sin(\omega_A)*\cos(\omega_B)-\sin(\omega_A-\omega_B) \quad (6)$$

If we proceed further to the next higher frequency channel 320-2, then for carrier frequency channel of $\omega_A+\omega_B+\omega_B$, the required local oscillators produced from demodulator 304-2 will be $$\cos(\omega_A + \omega_B + \omega_B) = \cos(\omega_A + \omega_B)*\cos(\omega_B) - \sin(\omega_A + \omega_B)*\sin(\omega_B) \quad (7)$$
$$= 2*\cos(\omega_A + \omega_B)*\cos(\omega_B) - \cos(\omega_A)$$

$$\sin(\omega_A + \omega_B + \omega_B) = \sin(\omega_A + \omega_B)*\cos(\omega_B) + \cos(\omega_A + \omega_B)*\sin(\omega_B) \quad (8)$$
$$= 2*\sin(\omega_A + \omega_B)*\cos(\omega_B) - \sin(\omega_A)$$

Then moving on to the next channel 320-3 channel frequency of $\omega_A+3\omega_B$, the required local oscillators produced by demodulator 304-3 will be $$\cos(\omega_A+3\omega_B)=2*\cos(\omega_A+2\omega_B)*\cos(\omega_B)-\cos(\omega_A+\omega_B) \quad (9)$$

$$\sin(\omega_A+3\omega_B)=2*\sin(\omega_A+2\omega_B)*\cos(\omega_B)-\sin(\omega_A+\omega_B) \quad (10)$$

From equations (7) to (10), we can generalize them as the following expressions for further demodulators 304-N after 304-3

$$\cos(\omega_A+N\omega_B)=2*\cos(\omega_A+(N-1)\omega_B)*\cos(\omega_B)-\cos(\omega_A+(N-2)\omega_B) \quad (11)$$

$$\sin(\omega_A+N\omega_b)=2*\sin(\omega_A+(N-1)\omega_B)*\cos(\omega_B)-\sin(\omega_A+(N-2)\omega_B) \quad (12)$$

for N=2, 3, 4, . . . .

In one example, demodulation may not start at a beginning of a block of carrier signals, and can start anywhere within a block of carrier signals. Thus, the system described above and below is very flexible as to what signals can be demodulated. In order to make this work a –N demodulator (e.g., an N less than 0 demodulator) can be used. It is to be appreciated the –N demodulator is not required if demodulation starts at the beginning of the block, thus it can be seen as an optional demodulator.

For the case of N<0, e.g., for a demodulator 304-(–N) the expressions will be $$\cos(\omega_A + N\omega_B) = 2*\cos(\omega_A + (N+1)\omega_B)*\cos(\omega_B) - \cos(\omega_A + (N+2)\omega_B) \quad (13)$$

$$\sin(\omega_A + N\omega_B) = 2*\sin(\omega_A + (N+1)\omega_B)*\cos(\omega_B) - \sin(\omega_A + (N+2)\omega_B) \quad (14)$$

for N=–1, –2, –3, . . . .

In this embodiment, based on equations (11) to (14), carrier demodulation can be done by using the computed values of the 2 adjacent channels. Thus, in this embodiment, only two oscillators 316 and 318 are used, one for generating $\cos(\omega_A)$ and $\sin(\omega_A)$, and the other for generating $\cos(\omega_B)$ and $\sin(\omega_B)$.

FIG. 4 shows an implementation of the demodulators 304-(–N) to 304-N, according to one embodiment of the present invention. In this example, the above operational parameters are met.

Demodulator 304-(–N) includes first and second mixers 422 and 423, first and second shifters 424 and 425, and first and second adders 426 and 427.

For example, in this digital example the shifters 424 and 425, as well as other shifters discussed below, left shift the signal leaving the mixers 422 and 423 by 1 bit. This is to produce the 2*cos and 2*sin variables in equations (13) and (14), and similar variables in the other equations. In an analog implementation, the shifter would be replaced with a gain device where the signal would be multiplied by 2.

In this example, through receipt, mixing, shifting, and adding of $I_{(-N+1)}$, $I_{(-N+2)}$, $Q_{(-N+1)}$ and $Q_{(-N+2)}$, and $\cos(\omega_B)$, respectively as shown, desired output signals as shown in equations (13) and (14) are produced, as discussed above, as signals $I_{-N}$ and $Q_{-N}$ along channel 320-(–N).

Demodulator 304-0 includes first and second mixers 428 and 429 that mix RFin signals (e.g., signal 106 or 210) with first and second signals $\cos(\omega_A)$ and $\sin(\omega_A)$, respectively, to produce the output signals shown in equations (1) and (2), discussed above, as signals Io and Qo along channel 320-0 and as inputs into subsequent demodulators 304. This demodulator is optional, as discussed above, Demodulator 304-1 includes first, second, third and fourth mixers 430, 431, 432, and 433, respectively, and first and second adders 434 and 435 that receive signals from demodulator 304-0 and from second oscillator 318, respectively as shown, to produce signals shown in equations (3) and (4), discussed above, as signals $I_1$ and $Q_1$ along channel 320-1 and as inputs to subsequent demodulators 304. This demodulator uses two additional mixers 431 and 433 as compared to other demodulators in this embodiment because, as seen in the related equations, the equations rely on N and N–1 previous demodulator outputs, which do not exist at this point, so to begin the process the two extra demodulators are used. However, from this point on, only one pair of mixers is required since there will be N and N–1 demodulator output signals.

Demodulators 304-2 to 304-N include first and second mixers 436-N and 437-N, first and second shifters 438-N and 439-N, and first and second adders 440-N and 441-N, which respectively receive signal $\cos(\omega_B)$ from second oscillator 318 and signals $I_{N'1}$, $I_{N-2}$, $Q_{N-1}$, and $Q_{N-2}$ from previous demodulators 304-(N–1) and 304-(N–2) to produce signals shown in equations (11) and (12), as discussed above, as signals $I_N$ and $Q_N$ along channel 320-N as, if appropriate, as inputs to subsequent demodulators 304.

It is to be appreciated this is merely one implementation of demodulator 304 that can be used to produce the desired signals.

Figure 5:
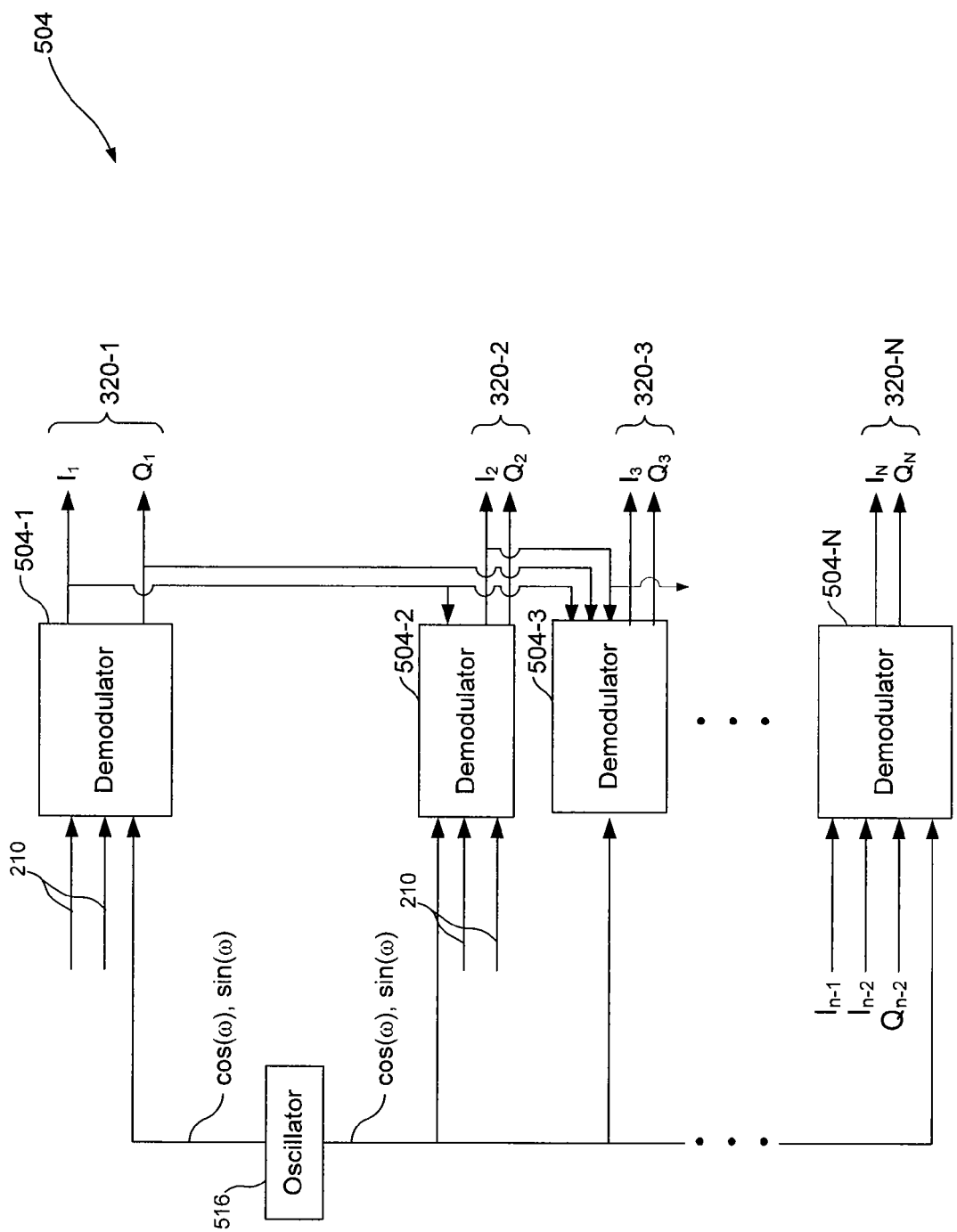
Figure 6:
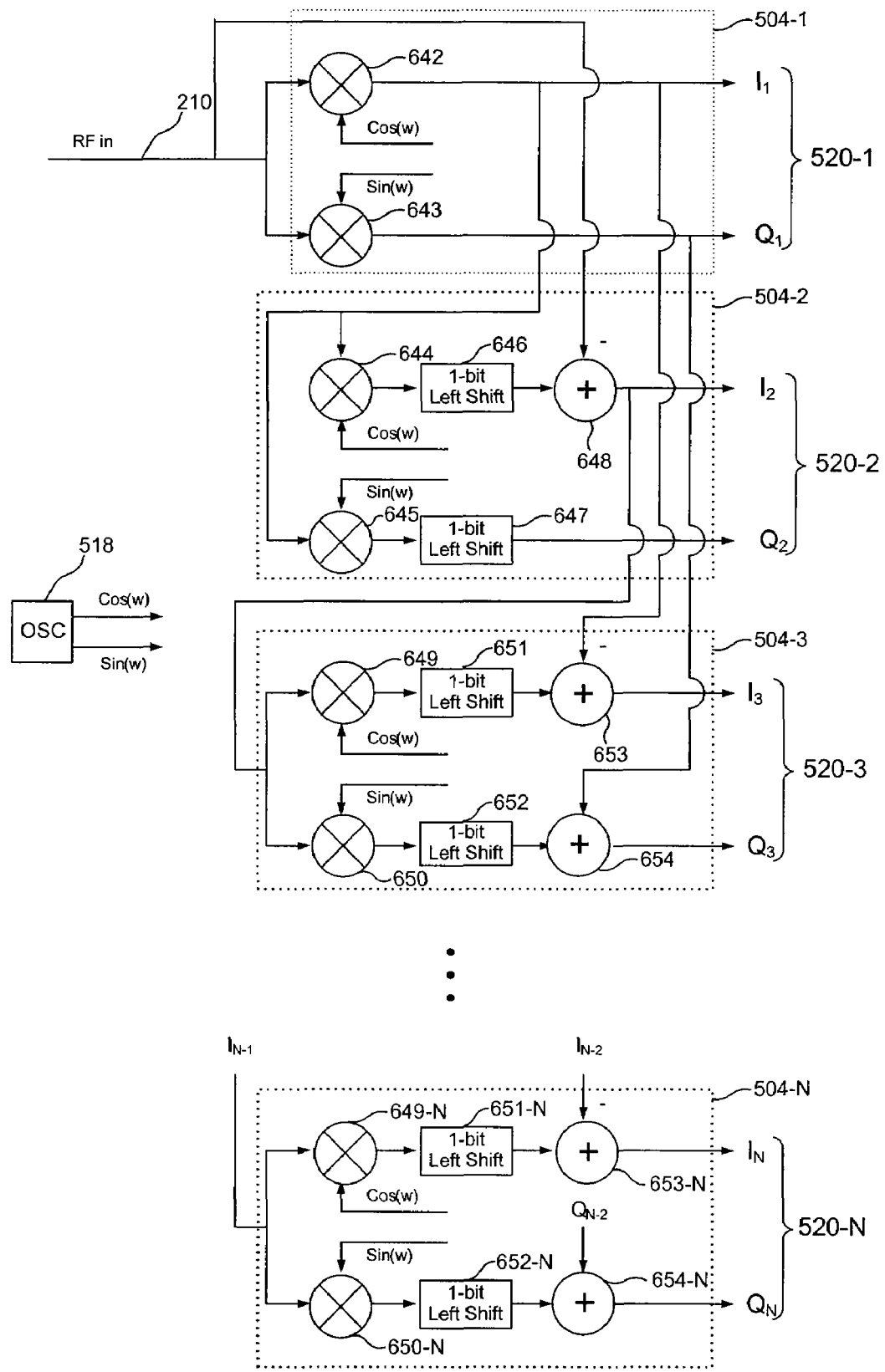

FIGS. 5 and 6 show details of a demodulator 504, according to one embodiment of the present invention. In this embodiment, ωA and ωB are the same, so they are shown as ω, thus only one oscillator, for example oscillator 516, is required to have demodulator 504 demodulate N number of digital signals 210. Oscillator 516 produces a first oscillator signal or first signal $\cos(\omega)$ and second oscillator signal or second signal $\sin(\omega)$, which is received by demodulator 504 that comprises N demodulators 504-1 to 504-N.

Thus, in this example when $\omega_A = \omega_B$, there is a special case in which equations (11) and (12) will become $$\cos(N\omega_A) = 2*\cos((N-1)\omega_A)*\cos(\omega_A) - \cos((N-2)\omega_A) \quad (15)$$

$$\sin(N\omega_A) = 2*\cos((N-1)\omega_A)*\sin(\omega_A) + \sin((N-2)\omega_A) \quad (16)$$

for N=2, 3, 4, . . . .

In this case, only one oscillator 516 is used to generate $\cos(\omega)$ and $\sin(\omega)$ in order to demodulate other N QAM carrier frequencies.

FIG. 6 shows an implementation of the demodulators 504-1 to 504-N, according to one embodiment of the present invention. In this example, the above operational parameters are met.

Demodulator 504-1 includes first and second mixers 642 and 643 that mix RFin signals (e.g., signal 106 or 210) with first and second signals $\cos(\omega)$ and $\sin(\omega)$, respectively, to produce the output signals shown in equations (15) and (16), discussed above, as signals $I_1$ and $Q_1$, along channel 520-1 and as inputs into subsequent demodulators 504.

Demodulator 504-2 includes first and second mixers 644 and 645, first and second shifters 646 and 647, and first adder 648 that receives RFin signals from demodulator 504-1 and from oscillator 518, respectively as shown, to produce signals shown in equations (15) and (16), discussed above, as signals $I_2$ and $Q_2$ along channel 520-2 and as inputs to subsequent demodulators 504.

Demodulator 504-3 to 504-N include first and second mixers 649-N and 650-N, first and second shifters 651-N and 652-N, and first and second adders 653-N and 654-N, which respectively receive signal $\cos(\omega)$ and $\sin(\omega)$ from oscillator 518 and signals $I_{N-1}$, $I_{N-2}$, and $Q_{N-2}$ from previous demodulators 504-(N–1) and 504-(N–2) to produce signals shown in equations (15) and (16) discussed above, as signals $I_N$ and $Q_N$ along channel 520-N, if appropriate, as inputs to subsequent demodulators 504.

It is to be appreciated this is merely one implementation of demodulator 504 that can be used to produce the desired signals.

Exemplary Methods

FIG. 7 shows a flowchart depicting a method 700, according to one embodiment of the present invention. In one example, method 700 is carried out using one or more of the systems described above. In step 702, a spacing between signals and a frequency of signals in a received block of signals is determined. In step 704, one or both oscillation devices in a pair of oscillation devices is initiated based on the spacing and the frequency of the signals. In step 706, what demodulator in a set of demodulators begins demodulation of the signals is determined based on which signal in the block of signals is first received by the set of demodulation devices. In step 708, the block of signals is demodulated.

FIG. 8 shows a flowchart depicting a method 800, according to one embodiment of the present invention. In one example, method 800 is carried out using one or more of the systems described above. Method 800 can be a method of demodulating a plurality of input channels. In step 802, a first oscillating signal is generated to demodulate a first channel of the plurality of input channels. In step 804, a second oscillating signal is generated to demodulate a second channel of the plurality of input channels. In step 806, a third channel, and in some examples subsequent channels, of the plurality of input channels is demodulated using the first and second oscillating signals. This allows for a reduction in the required amount of oscillating signals in order to demodulate any number of channels.

In one example, generating of the first oscillating signal is performed by mixing an input signal with a first signal, which can include sine and cosine components.

In one example, generating of the second oscillating signal is performed by mixing first and second portions of the first oscillating signal with a second signal, which can include sine and cosine components, to produce first through fourth mixed signals. Then, the first and third mixed signals are added and the second and fourth mixed signals are added to produce the second oscillating signal.

In one example, generating of the third oscillating signal is performed by mixing first and second portions of the second oscillating signal with a portion of the second signal, for example a cosine portion of the second signal, to produce first and second mixed signals. The first and second mixed signals are delayed, and then added to the first and second portions of the first oscillating signal to produce the third oscillating signal.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A system, comprising:
a first oscillator that produces first and second signals, the first signal having a frequency that is phase separated 90 degrees from a frequency of the second signal;
a second oscillator that produces third and fourth signals, the third signal having a frequency that is phase separated 90 degrees from a frequency of the fourth signal;
a first demodulator that receives the first and second signals and a carrier signal, the first demodulator generating a first pair of demodulated signals therefrom;
a second demodulator that receives the third and fourth signals and the first pair of demodulated signals, the second demodulator generating a second pair of demodulated signals therefrom; and
a third demodulator that receives the third signal and the first and second pair of demodulated signals, the third demodulator generating a third pair of demodulated signals therefrom,
wherein the first, second and third pair of demodulated signals are transmitted along first, second, and third channels, respectively.

2. The system of claim 1, further comprising:
an initializing demodulator that receives the third signal from the second oscillator and the carrier signal and generates –Nth pair of demodulator signals therefrom, wherein N is an integer.

3. The system of claim 1, wherein the oscillators comprise numerically controlled oscillators.

4. The system of claim 1, wherein:
the first and third signals are cosine signals; and
the second and fourth signals sine signals.

5. The system of claim 1, wherein:
the first and second signals respectively comprises an inphase and a quadrature carrier signals; and
each of the first, second, and third pairs of the demodulated signals respectively comprises a first, second, and third inphase demodulated signal and a first, second, and third quadrature demodulated signal.

6. The system of claim 1, wherein:
the first and second signals comprise first and second Quadrature Amplitude Modulation (QAM) signals; and
the first and second oscillators and first, second, and third demodulators substantially simultaneously demodulate the first and second QAM signals.

7. The system of claim 1, wherein the first demodulator comprises:
a first mixer that mixes the first signal and the carrier signal to generate the first demodulated signal; and
a second mixer that mixes the second signal and the carrier signal to generate the second demodulated signal.

8. The system of claim 1, wherein the second demodulator comprises:
a first mixer that mixes the third signal from the second oscillator and a first demodulator signal from the first pair of demodulator signals and produces a first mixed signal;
a second mixer that mixes the third signal from the second oscillator and second demodulator signal from the first pair of demodulator signals and produces a second mixed signal;
a third mixer that mixes the fourth signal from the second oscillator with the first demodulator signal from the first pair of demodulator signals and produces a third mixed signal;
a fourth mixer that mixes the fourth signal from the second oscillator with the second demodulator signal from the first pair of demodulator signals and produces a fourth mixed signal;
a first adder that subtracts the fourth mixed signal from the first mixed signal to produce a first demodulator signal of the second pair of demodulator signals; and
a second adder that adds the second mixed signal to the third mixed signal to produce a second demodulator signal of the second pair of demodulator signals.

9. The system of claim 1, wherein the third demodulator comprises:
a first mixer that receives a first demodulator signal from the second pair of demodulator signals and the third signal from the second oscillator to produce a first mixed signal;
a first shifting device that shifts the first mixed signal by a predetermined amount to produce a first shifted signal;
a first adder that subtracts a first demodulator signal from the first pair of demodulator signals from the first shifted signal to produce a first demodulator signal of the third pair of demodulator signals; and
a second mixer that receives a second demodulator signal from the second pair of demodulator signals and the third signal from the second oscillator to produce a second mixed signal;
a second shifting device that shifts the second mixed signal by a predetermined amount to produce a second shifted signal; and
a second adder that subtracts a second demodulator signal from the first pair of demodulator signals from the second shifted signal to produce a second demodulator signal of the third pair of demodulator signals.

10. The system of claim 1, further comprising:
an Nth demodulator that receives the fourth signal and an N−1 pair and a N−2 pair of demodulated signals, the Nth demodulator generating an Nth pair of demodulated signals therefrom, wherein N is an integer greater than 3 and the Nth pair of demodulated signals are transmitted along an Nth channel.

11. The system of claim 10, wherein the Nth demodulator comprises:
a first mixer that receives a first demodulator signal from the N−1th pair of demodulator signals and the third signal from the second oscillator to produce a first mixed signal;
a first shifting device that shifts the first mixed signal by a predetermined amount to produce a first shifted signal;
a first adder that subtracts a first demodulator signal from an N−2th pair of demodulator signals from the first shifted signal to produce a first demodulator signal of the Nth pair of demodulator signals; and
a second mixer that receives a second demodulator signal from the N−1th pair of demodulator signals and the third signal from the second oscillator to produce a second mixed signal;
a second shifting device that shifts the second mixed signal by a predetermined amount to produce a second shifted signal; and
a second adder that subtracts a second demodulator signal from the N−2th pair of demodulator signals from the second shifted signal to produce a second demodulator signal of the Nth pair of demodulator signals.

12. The system of claim 1, wherein when the first carrier signal equals a frequency difference between the first carrier signal and a second carrier signal the second oscillator is eliminated from the system, and when the second oscillator is eliminated from the system:
the second demodulator receives the first and second signals and the first pair of demodulated signals; and
the third demodulator receives the first and second signals and the first and second pair of demodulated signals.

13. The system of claim 12, wherein the first demodulator comprises:
a first mixer that mixes the first signal from the first oscillator and the first carrier signal to produce a first demodulator signal of the first pair of demodulator signals; and
a second mixer that mixes the second signal and the second carrier signal to produce the second demodulator signal of the second pair of demodulator signals.

14. The system of claim 12, wherein the second demodulator comprises:
a first mixer that mixes a first demodulator signal from the first pair of demodulator signals with the first signal from the first oscillator and produces a first mixed signal;
a first shifting device that shifts the first mixed signal by a predetermined amount to produce a first shifted signal;
a first adder that subtracts one of the first and second carrier signals from the first shifted signal to produce a first demodulator signal of the second pair of demodulator signals;
a second mixer that mixes the first demodulator signal from the first pair of demodulator signals with the second signal from the first oscillator to produce a second mixed signal; and
a second shifter that shifts the second mixed signal a predetermine amount to produce a second demodulator signal of the second pair of demodulator signals.

15. The system of claim 12, wherein the third demodulator comprises:
a first mixer that mixes a first demodulator signal from the second pair of demodulator signals with the first signal from the first oscillator and produces a first mixed signal;
a first shifting device that shifts the first mixed signal by a predetermined amount to produce a first shifted signal;
a first adder that subtracts a first demodulator signal of the first pair of demodulator signals from the first shifted signal to produce a first demodulator signal of the third pair of demodulator signals;
a second mixer that mixes the first demodulator signal from the second pair of demodulator signals with the second signal from the first oscillator to produce a second mixed signal;
a second shifter that shifts the second mixed signal a predetermine amount; and
a second adder that adds the second shifted signal to a second demodulator signal of the first pair of demodulator signals to produce a second demodulator signal of the third pair of demodulator signals.

16. The system of claim 12, further comprising:
an Nth demodulator that receives the first and second signals from the first oscillator and an N−1th pair and a N−2th pair of demodulated signals, the Nth demodulator generating an Nth pair of demodulated signals therefrom, wherein N is an integer greater than 3 and the Nth pair of demodulated signals are transmitted along an Nth channel.

17. The system of claim 16, wherein the Nth demodulator comprises:
a first mixer that mixes a first demodulator signal from the N−1th pair of demodulator signals with the first signal from the first oscillator and produces a first mixed signal;
a first shifting device that shifts the first mixed signal by a predetermined amount to produce a first shifted signal;
a first adder that subtracts a first demodulator signal of a N−2th pair of demodulator signals from the first shifted signal to produce a first demodulator signal of the Nth pair of demodulator signals;

a second mixer that mixes the first demodulator signal from the N−1th pair of demodulator signals with the second signal from the first oscillator to produce a second mixed signal;

a second shifter that shifts the second mixed signal a predetermine amount; and a second adder that adds the second shifted signal to a second demodulator signal of the N−2th pair of demodulator signals to produce a second demodulator signal of the Nth pair of demodulator signals.

18. A method, comprising:
   (a) determining a spacing between signals and a frequency of the signals in a received block of signals;
   (b) initiating one or both oscillation devices in a pair of oscillation devices based on the spacing and the frequency of the signals;
   (b) determining what demodulator in a set of demodulators begins demodulation of the signals based on which signal in the block of signals is first received by the set of demodulation devices; and
   (c) demodulating the block of signals.

19. The method of claim 18, wherein step (b) comprises using one of the oscillation devices if the spacing and the frequency are equal.

20. A method of demodulating a plurality of input channels, comprising:
   generating a first oscillating signal to demodulate a first channel of the plurality of input channels;
   generating a second oscillating signal to demodulate a second channel of the plurality of input channels; and
   demodulating a third channel of the plurality of input channels based on the first and second oscillating signals.

* * * * *